Dec. 2, 1952 — J. R. WOOD — 2,620,033
SHEET DELIVERY MECHANISM
Filed May 27, 1946 — 3 Sheets-Sheet 1

INVENTOR.
JAMES R. WOOD
BY
Kwis, Hudson, Boughton & William
ATTORNEYS

Dec. 2, 1952  J. R. WOOD  2,620,033
SHEET DELIVERY MECHANISM

Filed May 27, 1946  3 Sheets-Sheet 3

INVENTOR.
JAMES R. WOOD
BY
Kwis, Hudson, Boughton & Williams
ATTORNEYS

Patented Dec. 2, 1952

2,620,033

UNITED STATES PATENT OFFICE 2,620,033

SHEET DELIVERY MECHANISM

James R. Wood, Cleveland, Ohio, assignor to Harris-Seybold Company, Cleveland, Ohio, a corporation of Delaware Application May 27, 1946, Serial No. 672,349

8 Claims. (Cl. 164—61)

This invention relates to improvements in sheet delivery mechanism, particularly mechanism for conveying sheets from a sheet handling machine operating at high speed, a printing press for example, and depositing them upon a delivery pile while they are moving at a relatively low rate of speed.

One of the objects of the invention is the provision of delivery mechanism capable of taking sheets while operating at a high rate of speed and depositing them while operating at a low rate of speed.

Another object is the provision in such mechanism of two separate conveyors, one operating at constant speed and the other at varying speed.

Another object is the provision of efficient mechanism for operating a sheet conveyor at varying speed.

Another object is the provision of delivery mechanism adapted to slow sheets down prior to delivery without interference between any sheet and a succeeding sheet, or its conveying devices.

Another object is the provision of a delivery conveyor having variable speed above and below the speed at which it receives sheets, and arranged to operate upon each sheet so as to first decelerate it, then accelerate it and then decelerate it again before releasing it, whereby interference with succeeding sheets is eliminated.

Another object is the provision of a variable speed delivery conveyor comprising a plurality of spaced sets of sheet gripping devices in combination with conveying means arranged to present sheets at proper times to said devices.

Still another object is the provision of means for slitting or perforating sheets during their movement through a sheet delivery mechanism.

Other objects and features of novelty will appear as I proceed with the description of those embodiments of the invention which, for the purposes of the present application, I have illustrated in the accompanying drawings, in which Fig. 1 is a fragmental elevational view, largely diagrammatic, of a sheet delivery mechanism embodying the invention.

Figure 1:
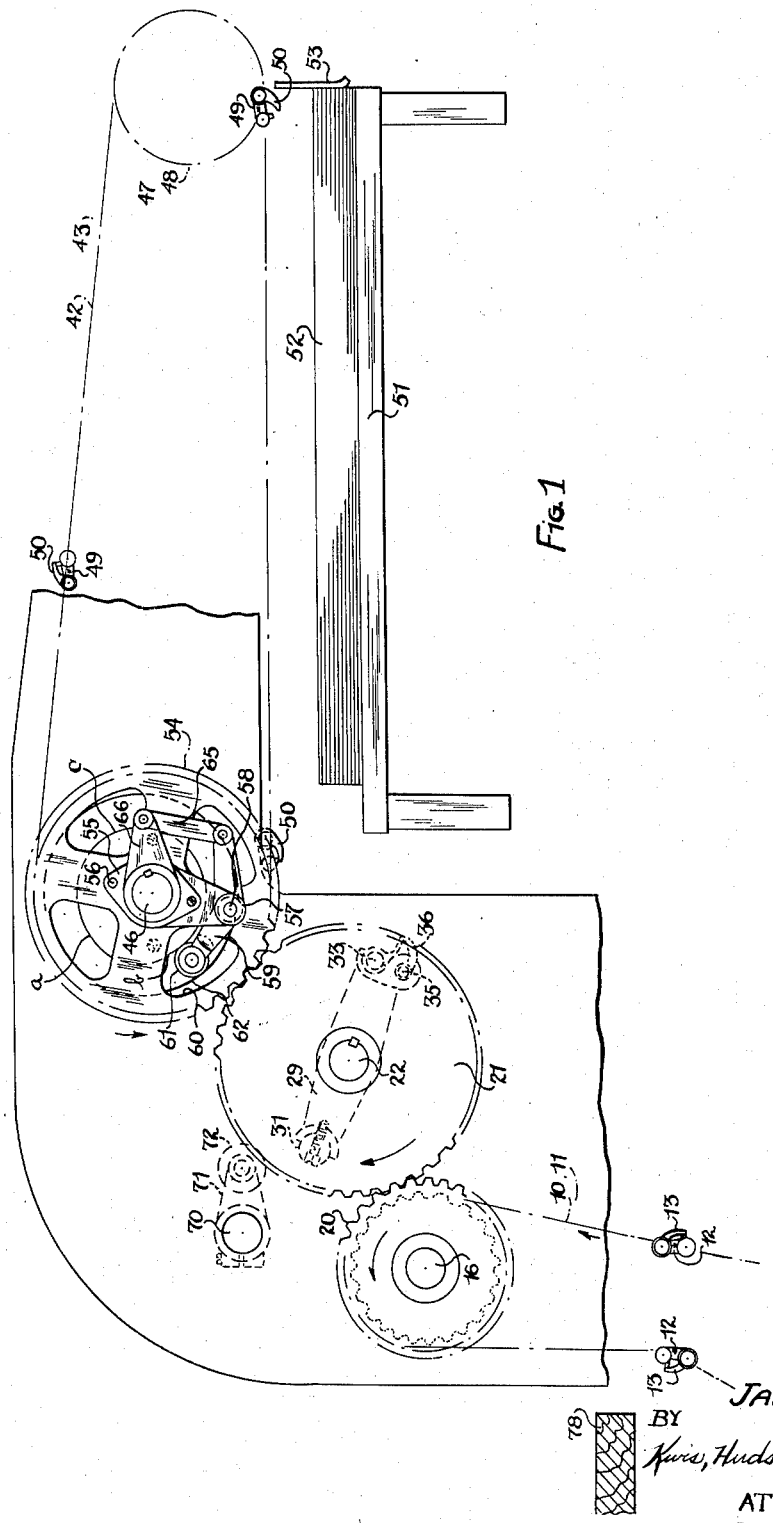
Figure 2:
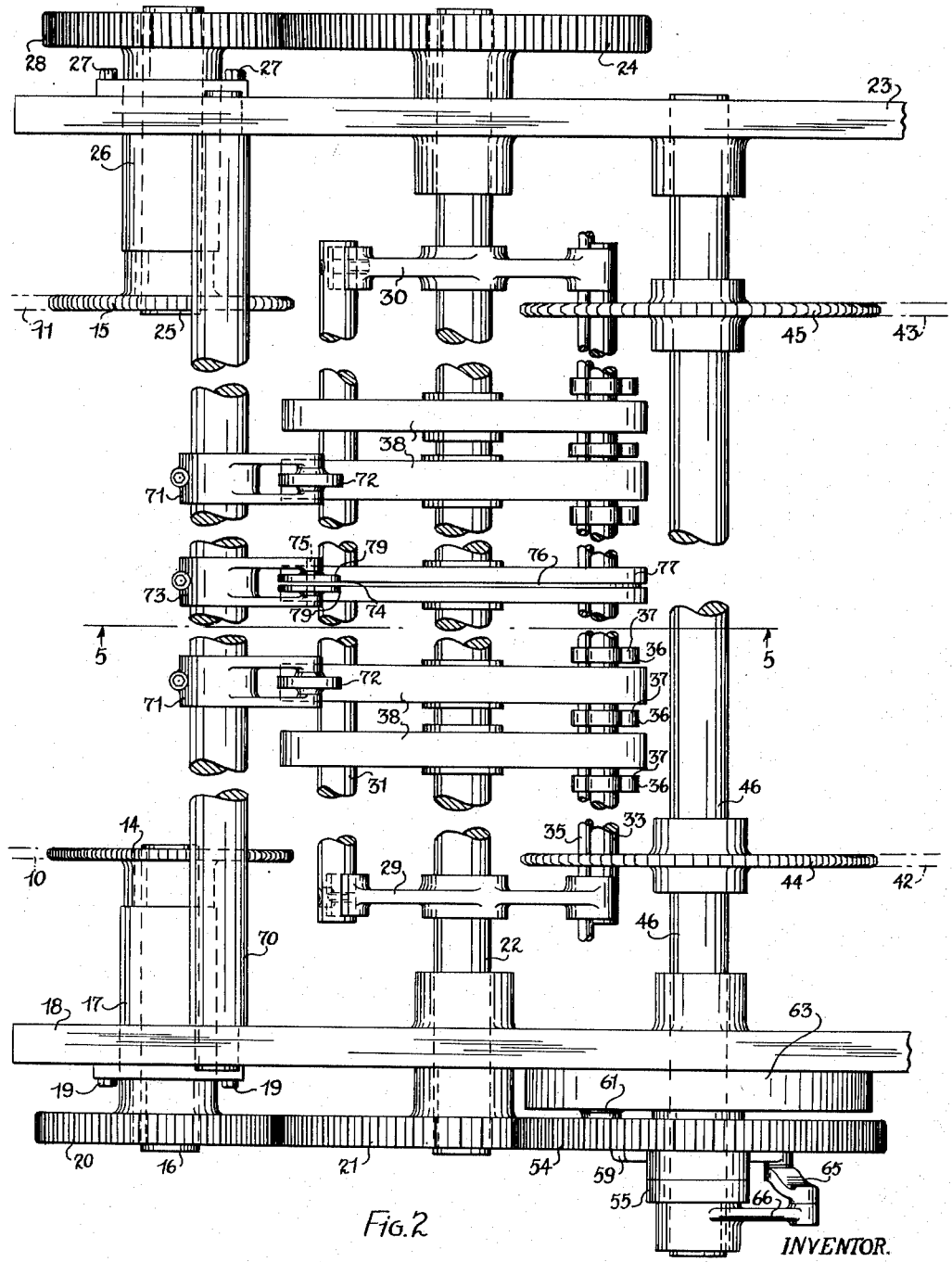
Fig. 2 is a fragmental plan view of the same, illustrating particularly the transfer mechanism interposed between the two conveyors, and the sheet slitting means associated with said transfer mechanism.
Figure 3:
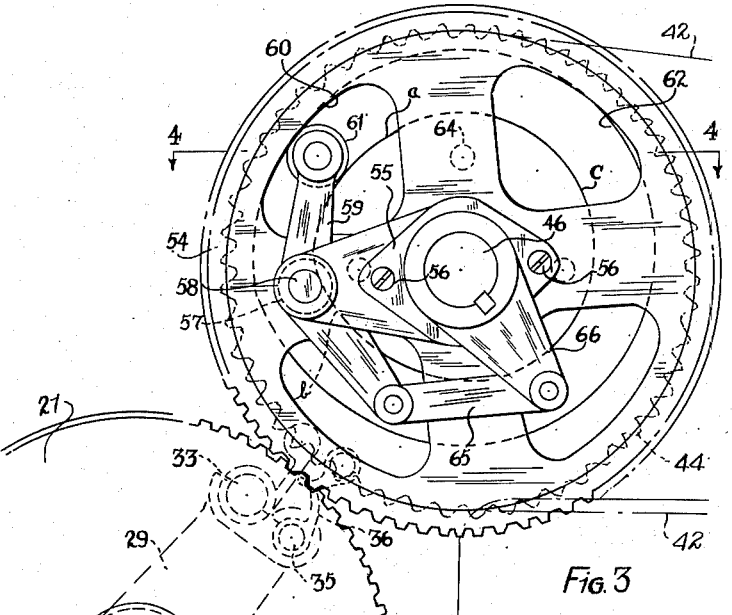
Fig. 3 is a fragmental side view on a larger scale showing the parts in the position for transferring a sheet from the transfer cylinder to the second conveyor.
Figure 4:
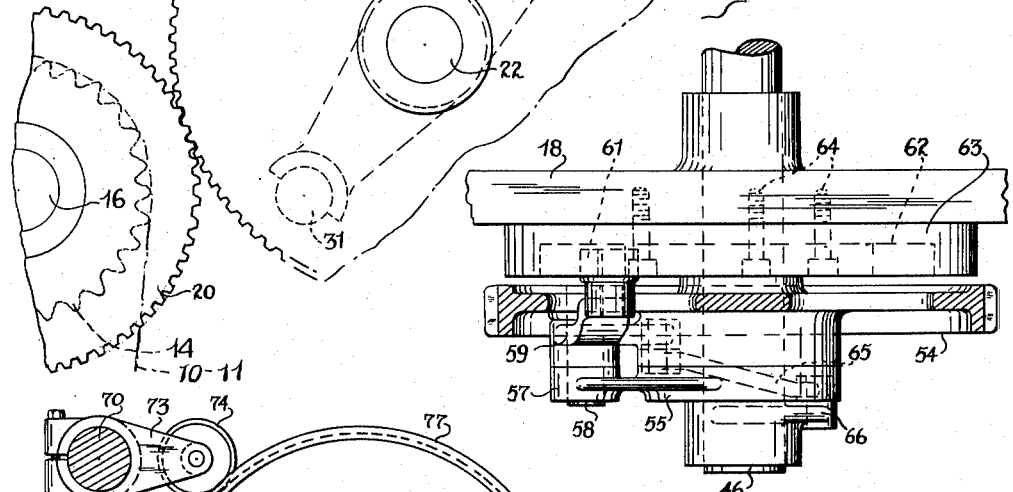
Fig. 4 is a horizontal sectional view taken substantially on the line 4—4 of Fig. 3.
Figure 5:
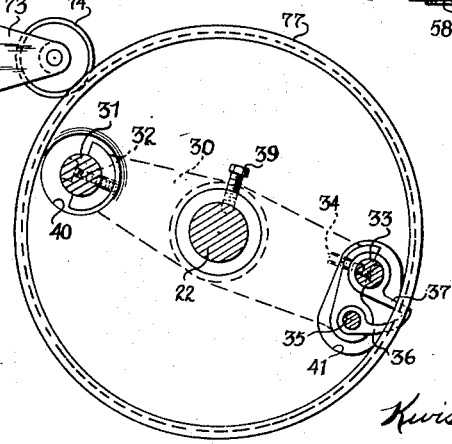
Fig. 5 is a cross-sectional view taken substantially on the line 5—5 of Fig. 2.

Modern printing presses operate at a high rate of speed. The sheet delivery mechanism for such presses must function at correspondingly high rates of speed, and in the conventional mechanism this means that the sheets when deposited on the delivery pile are moving at the same high rate of speed. They must therefore strike rather forcefully against the pile stops, which may damage the front edge of the sheet, cause it to bounce back away from the desired position on the pile or to buckle more or less. The present invention seeks to overcome this difficulty by the provision of means for slowing down the rate of travel of the sheets as they approach the position at which they are deposited upon the delivery pile.

In the drawings 10 and 11 represent the chains of a conveyor hereinafter referred to as the lower conveyor or first conveyor. This conveyor comprises a plurality of gripper bar units 12 which may be of conventional design and embody sheet grippers 13 for gripping the forward edge of a sheet to be conveyed. The chains 10 and 11 are driven by sprockets, not shown, which in turn are driven by the machine from which the sheets are to be delivered, such as a printing press. The chains 10 and 11 move at constant speed, and the gripper units 12 are operated in the usual manner to receive sheets and convey them along the lower run of the conveyor in the direction indicated by the arrow in Fig. 1.

Chains 10 and 11 are trained around sprockets 14, 15 and drive the latter separately, there being no common shaft for these two sprockets. Sprocket 14 is keyed to a stub shaft 16 which is rotatably journaled in a sleeve 17 secured to one of the side frames 18 of the delivery mechanism by screws 19.

The outer end of stub shaft 16 is keyed to a gear 20 which meshes with and drives a gear 21 keyed to a shaft 22 which is rotatably journaled in frame 18 and extends across the delivery mechanism through the other side frame 23 and has a gear 24 keyed to its other end. The sprocket 15 is keyed to another stub shaft 25, similar to shaft 16, which is rotatably journaled in a sleeve 26 secured to frame member 23 by screws 27. Stub shaft 25 has keyed thereto a gear 28 which meshes with and drives the gear 24 on shaft 22.

It will be seen that by means of the driving arrangement described each of the chains 10 and 11 imparts driving force to the shaft 22, or is driven thereby as the case may be, so that the gripper bar units carried by chains 10, 11 will at all times remain parallel to shaft 22 and the parts mounted thereon later to be described.

Keyed to shaft 22 are two or more brackets 29, 30 to which a tie rod 31 is rigidly secured by screws 32. A further tie rod 33 is secured to brackets 29, 30 by screws 34. A gripper shaft 35 is rotatably carried in brackets 29, 30 and has secured thereto a series of grippers 36 which engage gripper pads 37 carried by tie rod 33. Gripper shaft 35 is operated by mechanism, not shown, in the usual manner to open and close the grippers 36 in order to receive and deliver sheets at the proper times. The positions of grippers 36 and pads 37 are adjustable transversely of the machine in the usual manner.

Mounted upon shaft 22 is a series of sheet supporting disks or wheels 38 which are normally keyed to shaft 22 by screws 39 but are adjustable lengthwise of that shaft so as to occupy any desired positions transversely of the machine. Each of the wheels 38 is provided with an opening 40 through which tie rod 31 extends and an opening 41 at the opposite side for accommodating tie rod 33 and gripper shaft 35.

The shaft 22 and the devices mounted thereon constitute a transfer member which receives sheets from gripper units 12 of the lower conveyor and transfers them to an upper conveyor which will now be described. This upper conveyor comprises a pair of parallel chains 42 and 43 which are trained around sprockets 44, 45 keyed to a shaft 46 which is rotatably journaled in the frames 18, 23. These chains are also trained around sprockets 47, 48 and carry between them a series of gripper bars 49 each having a series of grippers 50 arranged across the delivery in the usual manner. Beneath the upper conveyor just described is located the usual delivery pile platform 51 which is arranged to receive the accumulated pile of sheets 52 as they are released by the conveyor. 53 are the usual sheet stops associated with such mechanism.

The upper conveyor is driven at variable speed by mechanism which will now be described. Gear 21 meshes with and drives gear 54 which is rotatably supported upon shaft 46. Bracket 55 is secured by screws 56 to the hub of gear 54 and is provided with a bearing 57 which receives one end of a stud 58, the other end of which is secured in the web of gear 54. Rotatably mounted on stud 58 is a cam lever 59, one end of which extends through an opening 60 in the web of gear 54 and carries a follower roller 61 which runs in the groove 62 of a cam 63 which is fixedly secured to frame 18 by means of screws 64. The other end of lever 59 is connected by a link 65 to an arm 66 which is keyed to shaft 46.

The cam groove 62 is formed with a high portion $a$ concentric with shaft 46, a steep downwardly sloping portion $b$, and a gradually rising portion $c$. It will be seen that as gear 54 rotates in the direction indicated by the arrow in Figure 1, the cam arm 59 is given a rocking movement by the cam groove 62 and that this rocking movement acts through link 65 and arm 66 to rotate shaft 46 at variable speed as compared to the speed of gear 54. Thus while follower 61 is running on the concentric portion $a$, arm 59 will remain stationary and gear 54 and shaft 46 will turn at the same speed. As follower 61 starts to move inwardly along the incline $b$, lever 59 will receive a clockwise movement which will decrease the speed of shaft 46 in relation to gear 54 so long as the clockwise movement of lever 59 continues. Furthermore, the difference in speed between shaft 46 and gear 54 will be maximum at the point where the slope of section $b$ is steepest. At such point, assuming gear 54 to be rotating at a constant speed, shaft 46 will rotate at minimum speed.

As follower 61 continues to move inwardly along the slope of section $b$ past the point of maximum slope thereof, the rate of clockwise rotation of lever 59 will decrease and will result in a decrease in the difference between shaft 46 and gear 54 until, when follower 61 reaches the lowest point of cam 62, shaft 46 and gear 54 will again rotate at the same speed. Then as follower 61 begins to move outwardly along the incline $c$, lever 59 will receive a counterclockwise movement which will cause shaft 46 to rotate more rapidly than gear 54 until roller 61 reaches the concentric portion $a$ of the cam.

Thus the effect of the cam 62 is to drive shaft 46 at constant speed for a portion of the cycle of rotation, then to decrease the speed of that shaft to a minimum and then to increase the speed of the shaft to a maximum which is greater than the speed of gear 54 and then to reduce the speed of the shaft again to equality with the speed of gear 54.

The movements of shaft 46 are, of course, transmitted directly to the chains 42, 43 and their gripper bar units 49. The arrangement of parts is such that the gripper units 49 travel at the same speed as gear 54 at the time each is receiving a sheet from the grippers 36 of the transfer member and travel at their minimum speed at a point over the pile 52 shortly in advance of the stops 53. It is at the latter position, that is when the grippers are moved at about their lowest speed, that the grippers 50 are opened to release the sheet to the pile. The mechanism is shown in Fig. 1 with the grippers 50 in approximately their position of slowest speed. In the mechanism illustrated, the grippers are slowed to about one half of the constant speed at which they receive sheets from the transfer member. Of course the three sets of grippers 50 move in unison with each other so that each set decelerates, accelerates and again decelerates three times during its travel through its complete path.

The lower or upright conveyor which comprises chains 10 and 11 and the upper or horizontal conveyor which comprises chains 42 and 43 are referred to hereinafter as endless conveyors, and this term is intended to be understood as meaning conveyors of the type which comprises endless chains and transverse gripper bars as distinguished from conveyors turning through circular paths such for example as sheet grippers mounted on rotating cylinders.

It will be apparent that each sheet is first taken from grippers 36 by grippers 50 at the speed of grippers 36, then is decelerated in unison with the preceding sheet which is then on the pile, then is accelerated to a speed greater than the speed at which it was taken from grippers 36, then is conveyed at uniform speed for a time and then is decelerated again just prior to being released by grippers 50 to the pile.

The purpose and advantages of such a procedure will be apparent from a study of the mechanism. When the sheet is decelerated immediately after being taken from grippers 36 its tail edge normally is also decelerated with the result that it approaches, or may even overlap the upwardly traveling grippers 13 carrying the succeeding sheet. At any rate, if the decelerated sheet were permitted to continue to travel at reduced speed the grippers 13 would catch up to and overlap the tail edge of that sheet by the time they reached the point where they transfer their sheet to grippers 36. This would interfere with the transfer of the sheet and damage the tail of the decelerated sheet.

This difficulty is avoided by the described arrangement in which the sheet in grippers 50 is accelerated immediately after its deceleration so that its tail edge is drawn away from grippers 13 before the latter reach their transfer point.

The arrangement of the delivery mechanism as described lends itself advantageously to the use of slitting or perforating mechanism which will now be described. A tie rod 70 is securely fixed in frames 18, 23 in any suitable manner. Mounted thereon is a plurality of brackets 71 each of which carries a freely rotatable wheel 72, these wheels being adapted to press the sheets against certain of the sheet supporting wheels 38 as the sheets are carried around the latter by the grippers 36. The wheels 72 function to control the body of the sheet to prevent it from lateral movement or uneven buckling.

Tie rod 70 also carries one or more brackets 73 which may be identical with brackets 71 and which support slitter wheels or perforator wheels which may be arranged in any desired number and location along tie rod 70. By way of example, a slitter wheel shown at 74 is rotatably carried on pin 75 supported in bracket 73. Slitter wheel 74 is arranged to extend slightly into a groove 76 and closely adjacent one side thereof to form an effective slitting arrangement. Groove 76 is formed in a wheel 77, otherwise similar to wheels 38, which is secured to shaft 22. On each side of wheel 74 is a guide roller 79 which controls the sheet. Bracket 73 and wheel 77 are adjustable laterally of the machine so as to enable slitting of these sheets at any desired location and, as previously mentioned, any number of such slitting or perforating arrangements may be provided.

As is apparent from a consideration of Fig. 1 particularly, the slitting or perforating devices are readily accessible to the operator of the machine and as a consequence, their operation may be continuously observed and adjustments readily made. It is the usual practice in machines having pile deliveries to provide a platform for the operator between the printing press or other machine and the pile delivery mechanism at a point above the lower part of the conveying mechanism. Such a platform in the present instance would be located above the horizontal portion of chains 10, 11 as indicated at 78 in Figure 1. It is apparent that the slitting or perforating devices are very conveniently located with respect to the operator on platform 78. Obviously the delivery device of this invention may be used with or without the slitting mechanism.

Since there is no shaft interposed between the sprockets 14 and 15, sheets, the front edges of which are carried by the grippers 36 of the transfer member, are free to swing loosely between these sprockets without danger of their printed surfaces striking against a shaft and being smudged thereby. When operating the delivery mechanism without the slitting arrangement, the wheels 72 may or may not be used to assist in guiding the sheets around the disks 38. If they are used, each sheet will ordinarily become temporarily bulged or buckled up above the wheels 38 between wheels 72 and grippers 50 due to the fact that the latter grippers decelerate while the wheels 38 and 72 continue to turn at uniform speed. The sheets will become straightened out by the acceleration of grippers 50 as they move over the pile.

Having thus described my invention, I claim:

1. In sheet delivery mechanism, a frame comprising side members, a conveyor comprising a pair of aligned stub shafts extending a short distance inwardly from said side members, a sprocket on the inner end of each of said shafts, a pair of endless chains running over said sprockets, gripper bars carried at their outer ends upon said chains, a rotary transfer device adapted to take sheets from said conveyor, said rotary device comprising a driven shaft, and intermeshing gears on said stub shafts and said driven shaft, whereby said gripper bars are maintained parallel to said driven shaft.

2. In a sheet delivery mechanism, two endless conveyors each carrying gripper bars, a rotary transfer device interposed between said conveyors having grippers adapted to take a sheet from the first conveyor and deliver it to the grippers on the gripper bars of the second conveyor, means for driving said transfer device at a speed to cause its grippers to travel at the same speed as those of said first conveyor at the transfer point, means for driving said second conveyor to cause its grippers to travel at the speed of the grippers of said transfer device at the time the front edge of a sheet is delivered to said second conveyor and thereafter at a speed less than that of the grippers of said transfer device while the sheet is still in contact with said transfer device, said transfer device comprising cylindrical surface portions, traction wheels bearing on said cylindrical surface portions, and sheet slitting mechanism associated with said cylindrical surface portions and their cooperating traction wheels, whereby the sheet is firmly held against said cylindrical surface portions and slitted while the sheet in advance of the traction wheels is buckled due to the temporarily slow travel of the forward edge thereof.

3. In a sheet delivery mechanism, two endless conveyors each carrying gripper bars, a rotary transfer device interposed between said conveyors having grippers adapted to take a sheet from the first conveyor and deliver it to the grippers on the gripper bars of the second conveyor, means for driving said transfer device at a speed to cause its grippers to travel at the same speed as those of said first conveyor at the transfer point, means for driving said second conveyor to cause its grippers to travel at the speed of the grippers of said transfer device at the time the front edge of a sheet is delivered to said second conveyor and thereafter causing the grippers on said second conveyor to travel at a speed less than that of the grippers of said transfer device while the sheet is still in contact with said transfer device, said transfer device comprising a shaft and a series of disks fast thereupon, a tie rod mounted parallel to said shaft, brackets on said tie rod opposite said disks, traction wheels carried by certain of said brackets bearing upon the corresponding disks, one of said disks being grooved, and one of said brackets carrying a slitting cutter cooperating with said groove, whereby the sheet is firmly held against said disks and slitted while the sheet in advance of the traction wheels is buckled due to the temporarily slow travel of the forward edge thereof.

4. In a sheet delivery mechanism, two endless conveyors each carrying gripper bars, a rotary transfer device interposed between said conveyors having grippers adapted to take a sheet from the first conveyor and deliver it to the grippers on the gripper bars of the second conveyor, means for driving said transfer device at a speed to cause its grippers to travel at the same speed as those of said first conveyor at the transfer point, means for driving said second conveyor to cause its grippers to travel at the speed of the grippers of said transfer device at the time the front edge of a sheet is delivered to said second conveyor and thereafter at a speed less than that of the grippers of said transfer device while the sheet is still in contact with said transfer device, said transfer device comprising a shaft and a pair of disks fast thereupon, traction wheels bearing on said disks and sheet slitting means interposed between said disks and their cooperating traction wheels, whereby the sheet is firmly held against said disks and slitted while the sheet in advance of the traction wheels is buckled due to the temporarily slow travel of the forward edge thereof.

5. In a machine of the character described, sheet delivery mechanism comprising a first upwardly traveling endless conveyor, a second horizontal variable speed endless conveyor, a rotary transfer device interposed between said conveyors having sheet grippers adapted to take sheets from the first conveyor and transfer them at the surface speed of the first conveyor to the lower run of said second conveyor, and mechanism embodying driving means cam controlled to decelerate the second conveyor after the sheets are delivered to it and before they are released by it.

6. In a machine of the character described, sheet delivery mechanism comprising an upstanding endless conveyor, a horizontally disposed endless conveyor, said endless conveyors each carrying gripper bars, a rotary transfer device interposed between said conveyors having sheet grippers adapted to take sheets from the gripper bars of the upstanding conveyor and deliver them to the gripper bars of the horizontal conveyor, said rotary transfer device having a surface speed like that of said upstanding conveyor, and mechanism embodying driving means cam controlled to decelerate said horizontal conveyor after the sheets are delivered to it and before they are released by it.

7. In a sheet delivery, a first endless conveyor having a plurality of gripper bars, a second endless conveyor having at least three gripper bars spaced apart a distance approximately equal to the distance between the gripper bars of the first conveyor, means for driving said second conveyor from said first conveyor comprising cam means for varying the speed of the second conveyor to take a sheet delivered from the first conveyor at the speed of the latter, decelerate it, then accelerate it to a speed higher than that of said first conveyor, and finally decelerate it and drop it at a speed below the speed of the first conveyor, said first deceleration permitting the tail edge of the sheet to be approached or passed by the forward edge of the succeeding sheet, and said acceleration withdrawing the tail edge of the sheet beyond the forward edge of the succeeding sheet before the latter reaches its transfer point.

8. In a sheet delivery, a first endless conveyor having a plurality of gripper bars, a second endless conveyor having at least three gripper bars spaced apart a distance approximately equal to the distance between the gripper bars of the first conveyor, a transfer cylinder disposed between said conveyors adapted to take a sheet from the first conveyor and deliver it to the second conveyor, said transfer cylinder being driven from said first conveyor at the same surface speed, means for driving said second conveyor from said transfer cylinder comprising cam means for varying the speed of the second conveyor to take a sheet from said transfer cylinder at the surface speed of the latter, decelerate it, then accelerate it to a speed higher than that of said transfer cylinder and finally decelerate it and drop it below the speed of the first conveyor, said first deceleration permitting the tail edge of the sheet to be approached or passed by the forward edge of the succeeding sheet and said acceleration withdrawing the tail edge of the first sheet beyond the point of transfer from the first conveyor to said transfer cylinder before the forward edge of the succeeding sheet reaches that point.

JAMES R. WOOD.

REFERENCES CITED

The following references are of record in the file of this patent:

UNITED STATES PATENTS

| Number | Name | Date |
|---|---|---|
| 319,460 | Cottrell | June 9, 1885 |
| 1,046,095 | McCain | Dec. 3, 1912 |
| 1,205,590 | Barber | Nov. 21, 1916 |
| 1,537,594 | Elsworth | May 12, 1925 |
| 2,014,248 | Evans | Sept. 10, 1935 |
| 2,032,276 | Frielinghaus | Feb. 25, 1936 |
| 2,065,300 | Barber | Dec. 22, 1936 |
| 2,094,339 | Barber | Sept. 28, 1937 |
| 2,110,585 | Barber | Mar. 8, 1938 |
| 2,110,980 | Swift | Mar. 15, 1938 |
| 2,226,674 | Seybold | Dec. 31, 1940 |
| 2,355,697 | Belluche | Aug. 15, 1944 |

FOREIGN PATENTS

| Number | Country | Date |
|---|---|---|
| 513,206 | Great Britain | Oct. 6, 1939 |